US012804358B2

(12) United States Patent
Gan et al.

(10) Patent No.: US 12,804,358 B2
(45) Date of Patent: Nov. 17, 2026

(54) METHOD AND APPARATUS FOR MULTICAST/BROADCAST SERVICE

(71) Applicant: Telefonaktiebolaget LM Ericsson (PUBL), Stockholm (SE)

(72) Inventors: Juying Gan, Shanghai (CN); Jie Ling, Shanghai (CN)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 309 days.

(21) Appl. No.: 18/578,277

(22) PCT Filed: Jul. 11, 2022

(86) PCT No.: PCT/CN2022/104905

§ 371 (c)(1),
(2) Date: Jan. 10, 2024

(87) PCT Pub. No.: WO2023/284676

PCT Pub. Date: Jan. 19, 2023

(65) Prior Publication Data

US 2024/0305956 A1 Sep. 12, 2024

(30) Foreign Application Priority Data

Jul. 12, 2021 (WO) ................ PCT/CN2021/105805

(51) Int. Cl.
*H04W 4/06* (2009.01)
*H04W 76/40* (2018.01)

(52) U.S. Cl.
CPC ............. *H04W 4/06* (2013.01); *H04W 76/40* (2018.02)

(58) Field of Classification Search
None
See application file for complete search history.

(56) References Cited

U.S. PATENT DOCUMENTS 12,375,888 B2 * 7/2025 Kim ........................ H04W 4/08
12,457,664 B2 * 10/2025 Schliwa-Bertling ......................... H04W 76/40

(Continued)

FOREIGN PATENT DOCUMENTS

| | | | |
|---|---|---|---|
| CN | 109819485 | A | 5/2019 |
| CN | 112954616 | A | 6/2021 |
| WO | WO2021133011 | A1 | 7/2021 |

OTHER PUBLICATIONS

3GPP TS 23.502 V17.0.0 (Mar. 2021); 3rd Generation Partnership Project; Technical Specification Group Services and System Aspects; Procedures for the 5G System (5GS); Stage 2 (Release 17).

(Continued)

*Primary Examiner* — Otis L Thompson, Jr.
(74) *Attorney, Agent, or Firm* — Baker Botts L.L.P.

(57) ABSTRACT

Embodiments of the present disclosure provide methods and apparatuses for multicast/broadcast service (MBS). A method performed by a session management function (SMF) comprises receiving a multicast session release request comprising an identifier of a multicast/broadcast service (MBS) session from a multicast/broadcast session management function (MB-SMF). The method further comprises checking at least one joined user equipment (UE) in the MBS session. The method further comprises avoiding triggering message to an Access and Mobility management Function (AMF) for one or more UEs without activated UP. The method further comprises marking the one or more UEs without activated UP as to be informed of a release of the MBS session.

10 Claims, 6 Drawing Sheets

(56) References Cited

U.S. PATENT DOCUMENTS

| | | | | |
|---|---|---|---|---|
| 12,508,936 | B2 * | 12/2025 | Qiao | B60L 53/665 |
| 2007/0011350 | A1 * | 1/2007 | Lu | H04L 12/185 709/238 |
| 2018/0199398 | A1 * | 7/2018 | Dao | H04W 76/27 |
| 2019/0223250 | A1 * | 7/2019 | Dao | H04W 72/23 |
| 2019/0254118 | A1 * | 8/2019 | Dao | H04L 67/141 |
| 2019/0394833 | A1 * | 12/2019 | Talebi Fard | H04W 60/00 |
| 2020/0092923 | A1 * | 3/2020 | Abraham | H04W 52/0216 |
| 2020/0367090 | A1 * | 11/2020 | Zhang | H04W 76/27 |
| 2020/0389935 | A1 * | 12/2020 | Jeong | H04W 24/04 |
| 2021/0059003 | A1 * | 2/2021 | Kim | H04W 76/36 |
| 2021/0105196 | A1 * | 4/2021 | Dao | H04L 47/24 |
| 2021/0234717 | A1 * | 7/2021 | Speicher | H04W 36/0016 |
| 2021/0352443 | A1 * | 11/2021 | Matolia | H04W 76/10 |
| 2021/0368373 | A1 * | 11/2021 | Youn | H04W 76/16 |
| 2021/0392466 | A1 * | 12/2021 | Liu | H04W 24/10 |
| 2022/0264258 | A1 * | 8/2022 | Zong | H04W 76/11 |
| 2022/0264697 | A1 * | 8/2022 | Shimoda | H04W 76/22 |
| 2022/0312156 | A1 * | 9/2022 | Xie | H04M 15/8016 |
| 2022/0322048 | A1 * | 10/2022 | Godin | H04L 12/189 |
| 2023/0007533 | A1 * | 1/2023 | Xie | H04L 12/189 |
| 2023/0025675 | A1 * | 1/2023 | Jia | H04W 76/32 |
| 2023/0045765 | A1 * | 2/2023 | Youn | H04W 60/005 |
| 2023/0082017 | A1 * | 3/2023 | Hong | H04W 76/22 370/312 |
| 2023/0096763 | A1 * | 3/2023 | Vesely | H04W 76/11 370/312 |
| 2023/0319514 | A1 * | 10/2023 | Kim | H04W 4/08 370/312 |
| 2023/0337325 | A1 * | 10/2023 | Li | H04W 52/0216 |
| 2023/0337326 | A1 * | 10/2023 | Estevez | H04W 76/40 |
| 2024/0073649 | A1 * | 2/2024 | Godin | H04L 12/1886 |

OTHER PUBLICATIONS

3GPP TS 23.247 V1.0.0 (Jun. 2021); 3rd Generation Partnership Project; Technical Specification Group Services and System Aspects; Architectural enhancements for 5G multicast-broadcast services; Stage 2 (Release 17).

SA WG2 Meeting #145E; May 14-28, 2021, E-Meeting; Source: Ericsson; Title: New [7.2.2.X] SMF Removing Joined UEs from MBS Session; Agenda Item: 8.9 (S2-2103958).

SA WG2 Meeting #146E; Aug. 16-27, 2021, E-Meeting; Source: Ericsson; Title: Update [7.2.2] UE leave MBS Session and MBS Session release; Agenda Item: 8.9 (S2-2105651).

PCT International Search Report issued for International application No. PCT/CN2022/104905—Oct. 9, 2022.

PCT Written Opinion of the International Searching Authority issued for International application No. PCT/CN2022/104905—Oct. 9, 2022.

3GPP TSG-RAN WG3 #111-e; E-Meeting, Jan. 25-Feb. 4, 2021; Agenda Item: 22.2.1; Source: Nokia, Nokia Shanghai Bell; Title: (TP for TS 38.300) MBS Session deactivation (R3-210163).

EPO Communication pursuant to Rules 70(2) and 70a(2) EPC issued for Application No. Patent No. 22841312.6-1218 / 4371318 PCT/CN2022104905—May 13, 2025.

EPO Communication issued regarding the extended European Search Report issued for Application No./Patent No. 22841312.6-1218 / 4371318 PCT/CN2022104905—Apr. 23, 2025.

* cited by examiner

METHOD AND APPARATUS FOR MULTICAST/BROADCAST SERVICE

PRIORITY

This nonprovisional application is a U.S. National Stage Filing under 35 U.S.C. § 371 of International Patent Application Serial No. PCT/CN2022/104905 filed Jul. 11, 2022 and entitled "METHOD AND APPARATUS FOR MULTICAST/BROADCAST SERVICE" which claims priority to International Patent Application Serial No. PCT/CN2021/105805 filed Jul. 12, 2021, both of which are hereby incorporated by reference in their entirety.

TECHNICAL FIELD

The non-limiting and exemplary embodiments of the present disclosure generally relate to the technical field of communications, and specifically to methods and apparatuses for multicast/broadcast service (MBS).

BACKGROUND

This section introduces aspects that may facilitate a better understanding of the disclosure. Accordingly, the statements of this section are to be read in this light and are not to be understood as admissions about what is in the prior art or what is not in the prior art.

Multicast and Broadcast Service (MBS) is a point-to-multipoint service in which data is transmitted from a single source entity to multiple recipients. There are two types of MBS session: broadcast session and multicast session.

Third Generation Partnership Project (3GPP) TS 23.247 V1.0.0, the disclosure of which is incorporated by reference herein in its entirety, describes architectural enhancements for 5G (fifth generation) multicast-broadcast services. As described in 3GPP TS 23.247 V1.0.0, the term "5GC Individual MBS traffic delivery" means that 5G CN (core network) receives a single copy of MBS data packets and delivers separate copies of those MBS data packets to individual UEs via per-UE PDU sessions, hence for each such UE one protocol data unit (PDU) session is required to be associated with a multicast session. The term "5GC shared MBS traffic delivery" means that 5G CN receives a single copy of MBS data packets and delivers a single copy of those MBS data packets to a RAN (radio access network) node. The term "Associated PDU Session" refers to a PDU Session associated to a multicast session that is used for 5GC (5G core network) individual MBS traffic delivery method and for signaling related to a user's participation in a multicast session such as join and leave requests. The term "Multicast MBS session" refers to an MBS session to deliver the multicast communication service. A multicast MBS session is characterized by the content to send, by the list of UEs that may receive the service and optionally by a multicast area where to distribute it.

FIG. 1 shows a 5G MBS system architecture in reference point representation, which is same as FIGS. 5.1-2 of 3GPP TS 23.247 V1.0.0. The 5G MBS system architecture may comprise functional entities such as PCF (Policy Control Function), MB-SMF (Multicast/Broadcast Session Management Function), SMF (Session Management Function), MB-UPF (Multicast/Broadcast User plane Function), UPF (User plane Function), AMF (Access and mobility Function), NG-RAN (next generation radio access network), UE (user equipment), AF (Application Function), NEF (Network Exposure Function), MBSF (Multicast/Broadcast Service Function), MBSTF (Multicast/Broadcast Service Transport Function), UDM (Unified Data Management), UDR (Unified Data Repository), NRF (Network Repository Function), etc. These functional entities have been described in clause 5.3.2 of 3GPP TS 23.247 V1.0.0.

For example, the MB-SMF may perform the following functions to support MBS:

- General for multicast and broadcast sessions:
  - Supporting MBS session management (including QoS control).
  - Configuring the MB-UPF for multicast and broadcast flows transport based on the policy rules for multicast and broadcast services from PCF or local policy.
  - Allocating and de-allocating TMGIs.
- Specific for broadcast sessions:
  - Interacting with RAN (via AMF) to control data transport using 5GC Shared MBS traffic delivery method.
- Specific for multicast sessions:
  - Interacting with SMF to modify PDU Session associated with MBS.
  - Interacting with RAN (via AMF and SMF) to establish data transmission resources between MB-UPF and RAN nodes for 5GC Shared MBS traffic delivery method.
  - Controlling multicast data transport using 5GC Individual MBS traffic delivery method.

The SMF may perform the following functions to support MBS:

- Discovering MB-SMF for multicast session.
- Authorizing multicast session join operation if needed.
- Interacting with MB-SMF to obtain and manage multicast session context.
- Interacting with RAN for shared data transmission resource establishment.

NOTE: SMF and MB-SMF may be co-located or deployed separately.

The AMF may perform the following functions to support MBS:

- Signalling with NG-RAN and MB-SMF for MBS Session management.
- Selection of NG-RANs for notification of multicast session activation toward UEs in CM (connection management)-IDLE state.
- Selection of NG-RANs for broadcast.
- Signalling with NG-RAN for NG-RAN MBS capability, or.
- May be configured with NG-RAN MBS capability.

The MBS System Architecture may contain the following reference points:

N3mb: Reference point between the (R)AN and the MB-UPF.

N4mb: Reference point between the MB-SMF and the MB-UPF.

N6mb: Reference point between the MB-UPF and the AF/AS.

N7mb: Reference point between the MB-SMF and the PCF.

N11mb: Reference point between the AMF and the MB-SMF.

N16mb: Reference point between the SMF and the MB-SMF.

N19mb: Reference Point between the UPF and the MB-UPF.

N29mb: Reference point between the MB-SMF and the NEF.

Nmb1: Reference point between the MB-SMF and the MBSF.

Nmb2: Reference point between the MBSF and the MBSTF.

Nmb5: Reference point between the MBSF and the NEF.

Nmb8: Reference point between the MBSTF and the AF.

Nmb9: Reference point between the MB-UPF and the MBSTF.

Nmb10: Reference point between the MBSF and the AF.

Nmb12: Reference point between the MBSF and the PCF.

Nmb13: Reference point between the MB-SMF and the AF.

The MBS System Architecture reuses the existing reference points of N1, N2, N10, N11, and N33 with enhancement to support 5G MBS.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

FIG. 2 shows a flowchart of SMF removing joined UEs from MBS session, which is same as FIG. 7.2.2.3-1 of 3GPP TS 23.247 V1.0.0.

When the SMF receives the multicast session release request from the MB-SMF, the SMF initiated procedures to remove joined UEs from the MBS session.

NOTE: For the active MBS session, the MB-SMF can triggers Multicast Session Deactivation towards the NG-RAN via the AMF to release radio resources of the MBS session as specified in step 3 to step 7 in clause 7.2.5.3 of 3GPP TS 23.247 V1.0.0, prior to or in parallel with sending multicast session release request to the SMF.

In an embodiment, the radio resource release can also be done as part of the UE multicast session release procedure and not need be as an additional procedure.

Step 0. The MB-SMF triggers the NG-RANs via the AMFs to release radio resources for the MBS session. Same procedure as defined in step 3-7 in clause 7.2.5.3 of 3GPP TS 23.247 V1.0.0 is used.

Step 1. The SMF receives Multicast Session Release request from the MB-SMF with MBS Session ID (identifier) . The SMF checks joined UEs. The SMF sends Multicast Session Release response to the MB-SMF.

Step 2. The SMF triggers the UE to be reachable. Same procedure as defined in step 3-7 in clause 7.2.5.2 of 3GPP TS 23.247 V1.0.0 is used.

Step 3. For each joined UEs, the SMF invokes Namf_Communicate_NIN2MessageTransfer to the AMF. The N1 SM container indicates MBS session release. In N2 SM information, the SMF informs the NG-RAN to remove the UE from the MBS session.

Step 4. The AMF sends N2 Request to the NG-RAN.

Step 5. The NG-RAN transports the N1 SM (Session Management) container (PDU Session Modification Command) to the UE.

Step 6. The NG-RAN performs radio resource modification. If no joined UEs in the MBS session, the NG-RAN release the radio resources.

Step 7. If no joined UEs in the MBS session, for unicast transport of N3mb, the NG-RAN initiates the DL(downlink) tunnel release towards MB-UPF via AMF and MB-SMF. For multicast transportation of N3mb, the NG-RAN performs Internet Group Management Protocol (IGMP)/Multicast Listener Discovery (MLD) Leave for the MBS session.

Step 8. The NG-RAN sends N2 Response to the AMF. If no joined UEs in the MBS session, the MBS Session context is removed from the NG-RAN.

Step 9. The AMF transfers the N2 message received in step 8 of FIG. 2 to the SMF via the Nsmf_PDUSession_UpdateSMContext service operation. The SMF removes the UE from the MBS Session.

Among the steps above, Step 2 of FIG. 2 refers to step 3-7 of clause 7.2.5.2 (to bring the CM-IDLE UEs into CM-CONNECTED) of 3GPP TS 23.247 V1.0.0.

FIG. 3 shows a flowchart of MBS session activation procedure, which is same as FIG. 7.2.5.2-1 of 3GPP TS 23.247 V1.0.0.

The following can trigger the MBS session activation procedure:

AF requests MB-SMF to activate the MBS session;

MB-UPF receives the multicast data and notifies MB-SMF.

Step 1. The procedure may be triggered by the following events:

When MB-UPF receives downlink data for a MBS session, MB-UPF sends MB-N4 Notification (N4 Session ID) to the MB-SMF for activating the MBS session.

AF sends MBS Activation request (TMGI) to the MB-SMF directly or via NEF.

Step 2. MB-SMF sends Session activation notification (TMGI) to SMF(s).

Based on the received TMGI, SMF finds the list of UEs that joined the MBS session identified by the TMGI. If SMF determines the user plane of the associated PDU session(s) of the UE(s) with respect to TMGI are activated already, steps 3-9 of FIG. 3 will be skipped for those UE.

Step 3. SMF sends MBS_Session_Notification Request to AMF, with including (UE list, TMGI).

After receiving the request, for each UE in the list, the AMF determines CM state of the UE: see steps 4-7 of FIG. 3.

Step 4. [Optional] If the UE involved in the MBS Session is in CM-CONNECTED state, the AMF responds the list of the UE involved in the MBS Session and in CM-CONNECTED state, using MBS_Session_Notification Response (UE list). Step 5-6 of FIG. 3 will not be executed for that UEs in the list.

Step 5. [Optional] If AMF determines that there are any UEs in CM-IDLE state and involved in the MBS Session, and AMF figures out the paging area considering all the UE(s), which need be paged. The AMF sends a paging request message to the NG-RAN node(s) belonging to this Paging Area with the TMGI as the identifier to be paged if the related NG-RAN node(s) support the MBS session.

Step 6. The UE in IDLE state sends Service Request message to AMF, see clause 4.2.3 of 3GPP TS 23.502 V17.0.0, the disclosure of which is incorporated by reference herein in its entirety.

Step 7. After receiving the Service Request sent by the UE, the AMF responds to MB—SMF with MBS_Session_Notification Response (UE ID) message.

Step 8. After receiving MBS_Session_Notification Response message, SMF determines the related UE is in CM-Connected State and sends Namf_Communication_NIN2MessageTransfer (N2 SM message (MBS Session identifier, associated QoS profiles) to AMF for the UE which is identified in step 3 of FIG. 3.

Step 9. AMF sends N2 request message (N2 SM message (MBS Session identifier, associated QoS profiles) to the RAN node.

Step 10. If the shared tunnel has not been established before, the shared tunnel is established at this step, as steps 7a to 7e defined in clause 7.2.1.3 of 3GPP TS 23.247 V1.0.0. In addition, NG-RAN responses to SMF, as steps 9 to 12 defined in clause 7.2.1.3 of 3GPP TS 23.247 V1.0.0. The NG-RAN configures UE with RRC (Radio Resource Control) messages if needed.

Step 11. MB-SMF sends Session Activation (TMGI) to the AMF.

NOTE 2: The messages in step 10 and 11 are MBS-specific messages and it is possible that the AMF(s) in step 10 of FIG. 3 are not associated to any UEs involved in the MBS Session.

Step 12. AMF sends NGAP (Next Generation Application Protocol) activation message (TMGI) to the RAN nodes.

There are some problems for the current procedure of SMF removing joined UEs from MBS session. For example, when the AF initiates MBS Session release, for joined UEs without UP (user plane) of the associated PDU Session, the same procedure as for MBS Session Activation is performed as follows:

- The SMF triggers MBS Session Notify message to the AMF to trigger paging to the joined UEs.
- For NG-RAN supporting MBS, AMF triggers group paging and the UE respond to the paging by sending Service Request.
- For NG-RAN not supporting MBS, AMF initiates individual paging (i.e. legacy paging that AMF sends paging message for each UE).
- When UE responds, the SMF then sends PDU Session Modification Command informing the UE of the MBS Session release.

At MBS Session Release, if the UE is not informed of MBS Session release/removal in time (i.e. UE is not paged only for the purpose of sending PDU Session Modification Command to remove an MBS Session from a UE), there is no risk of UE sending UL (uplink) data as the MBS data is sent only in downlink direction. Therefore the current procedure of SMF removing joined UEs from MBS session may introduce additional signaling to bring the joined UEs from CM-IDLE to CM-CONNECTED. It may introduce additional complexity for AMF and SMF to handle paging for UEs that joined an MBS Session.

To overcome or mitigate at least one above mentioned problems or other problems, the embodiments of the present disclosure propose an improved MBS solution.

In an embodiment, to save signaling and simplify the handling in AMF and SMF for MBS Session Release, a solution is proposed. At MBS Session Release, for UE(s) that joined MBS Session but in idle state (e.g., without activated UP (user plane)), the SMF marks that the UE(s) is to be informed of MBS Session release. When the UE is in connected state (e.g., at next UP activation of the associated PDU Session), the SMF sends PDU Session Modification Command informing the UE(s) of the MBS Session release. For example, when MBS Session is released (e.g. by AF), for joined UE(s) in idle state (e.g., without UP activated for the associated PDU Session), SMF delays sending PDU Session Modification Command informing the UE(s) of the MBS Session release until the UE(s) is in connected state (e.g., the next UP activation for the associated PDU Session).

In a first aspect of the disclosure, there is provided a method performed by a session management function (SMF). The method comprises receiving a multicast session release request comprising an identifier of a multicast/broadcast service (MBS) session from a multicast/broadcast session management function (MB-SMF). The method further comprises checking at least one joined user equipment (UE) in the MBS session. The method further comprises avoiding triggering message to an Access and Mobility management Function (AMF) for one or more UEs without activated UP. The method further comprises marking the one or more UEs without activated UP as to be informed of a release of the MBS session.

In an embodiment, the method further comprises marking the one or more UEs in idle state as to be informed of a release of the MBS session.

In an embodiment, the method further comprises determining a UE of the one or more UEs is in connected state.

In an embodiment, determining the UE of the one or more UEs is in connected state comprises determining the user plane for the PDU session associated to the MBS session of the UE is activated In an embodiment, determining the user plane for the PDU session associated to the MBS session of the UE is activated comprises determining the user plane for the PDU session associated to the MBS session of the UE is activated when the UE triggers a service request or a network entity triggers a service request with the UE.

In an embodiment, the method further comprises initiating a PDU session modification command informing the at least one joined UE of a release of the MBS session.

In a second aspect of the disclosure, there is provided a session management function (SMF). The SMF comprises a processor and a memory coupled to the processor. Said memory contains instructions executable by said processor. Said SMF is operative to receive a multicast session release request comprising an identifier of a multicast/broadcast service (MBS) session from a multicast/broadcast session management function (MB-SMF). Said SMF is further operative to check at least one joined user equipment (UE) in the MBS session. Said SMF is further operative to avoid triggering message to an Access and Mobility management Function, AMF, for one or more UEs without activated UP. Said SMF is further operative to mark the one or more UEs without activated UP as to be informed of a release of the MBS session.

In a third aspect of the disclosure, there is provided a SMF. The SMF comprises a receiving module configured to receive a multicast session release request comprising an identifier of a multicast/broadcast service (MBS) session from a multicast/broadcast session management function (MB-SMF). The SMF further comprises a checking module configured to check at least one joined user equipment (UE) in the MBS session. The SMF further comprises an avoiding module configured to avoid triggering message to an Access and Mobility management Function, AMF, for one or more UEs without activated UP. The SMF further comprises a marking module configured to mark the one or more UEs in idle state as to be informed of a release of the MBS session.

In an embodiment, the SMF further comprises a determining module configured to determine a UE of the one or more UEs is in connected state.

In an embodiment, the determining module may determine the UE of the one or more UEs is in connected state when the user plane for the PDU session associated to the MBS session of the UE is activated.

In an embodiment, the determining module may determine the user plane for the PDU session associated to the MBS session of the UE is activated when the UE triggers a service request or a network entity triggers a service request with the UE.

In an embodiment, the SMF further comprises an initiating module configured to initiate a PDU session modification command informing the at least one joined UE of a release of the MBS session.

In a fourth aspect of the disclosure, there is provided a computer-readable storage medium storing instructions which when executed by at least one processor, cause the at least one processor to perform any of the methods according to the first aspect of the disclosure.

In a fifth aspect of the disclosure, there is provided a computer program product, comprising instructions which, when executed on at least one processor, cause the at least one processor to carry out any of the methods according to the first aspect of the disclosure.

Many advantages may be achieved by applying the proposed solution according to embodiments of the present disclosure. For example, some embodiments of the present disclosure can avoid paging to UE(s) that joined an MBS Session just for the purpose of informing the UE(s) of the MBS Session release, therefore signaling for paging and paging response can be saved. The embodiments herein are not limited to the features and advantages mentioned above. A person skilled in the art will recognize additional features and advantages upon reading the following detailed description.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
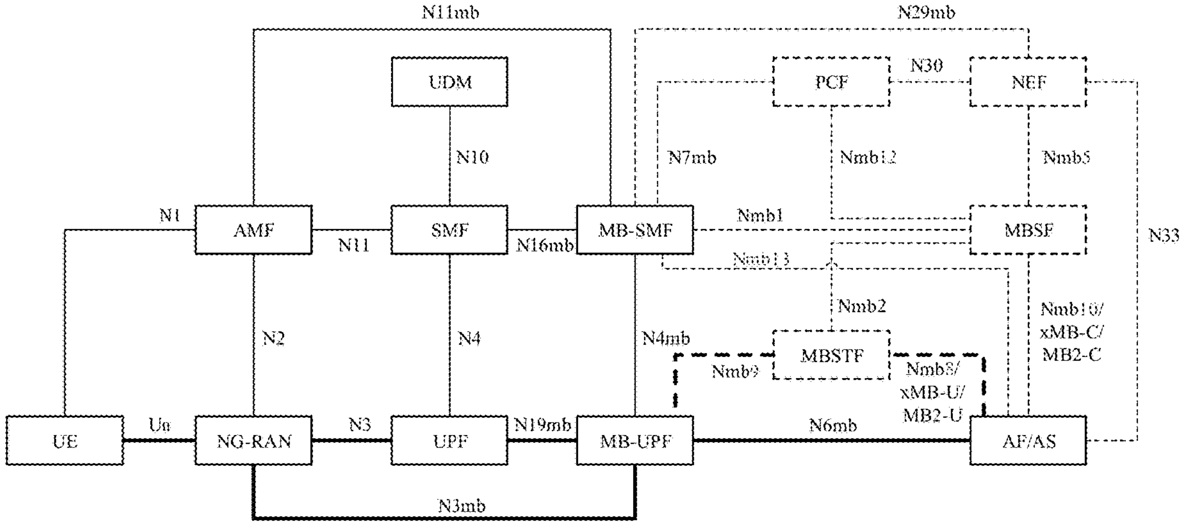
FIG. 1 shows a 5G MBS system architecture in reference point representation.
Figure 2:
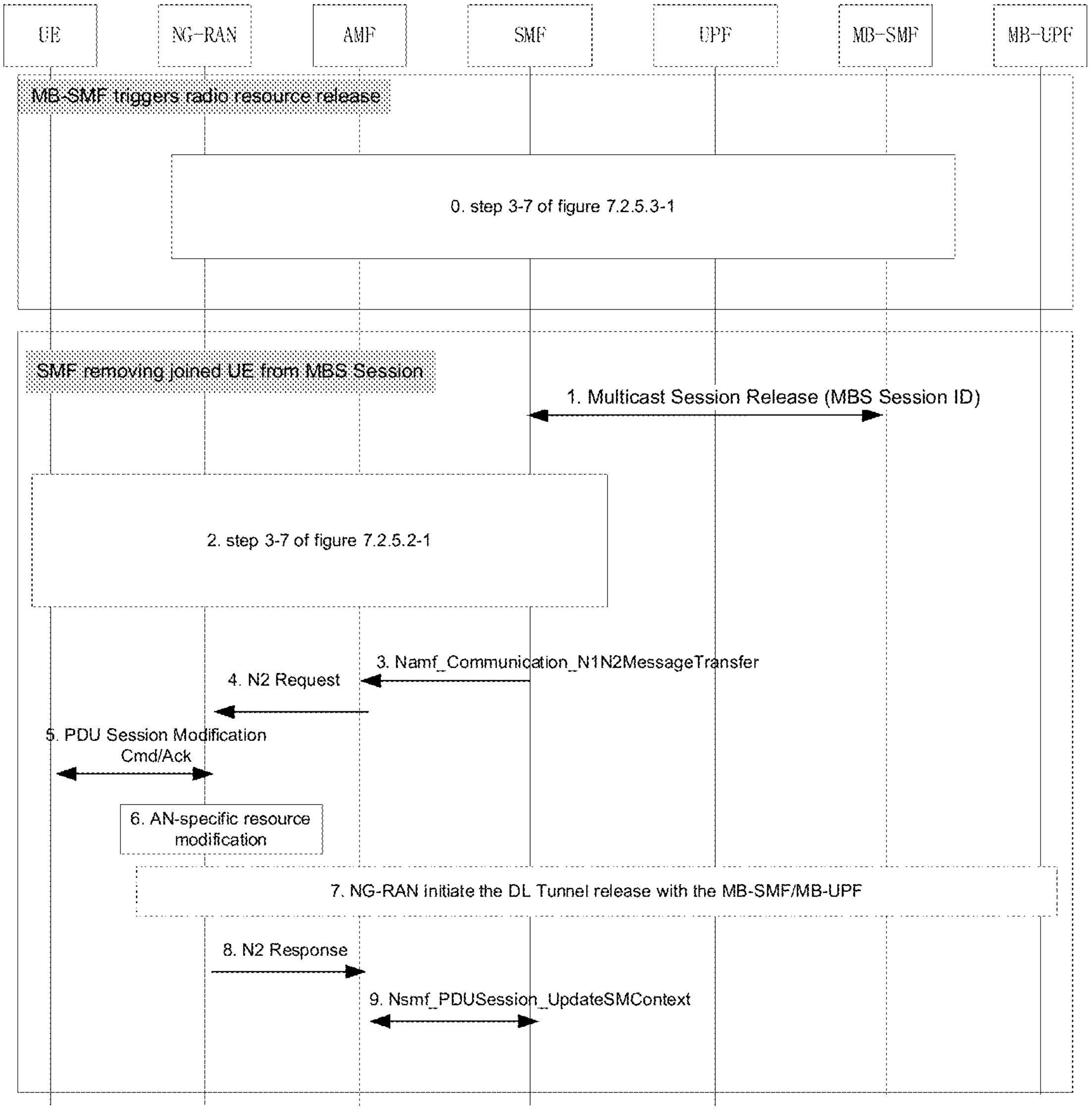
FIG. 2 shows a flowchart of SMF removing joined UEs from MBS session.
Figure 3:
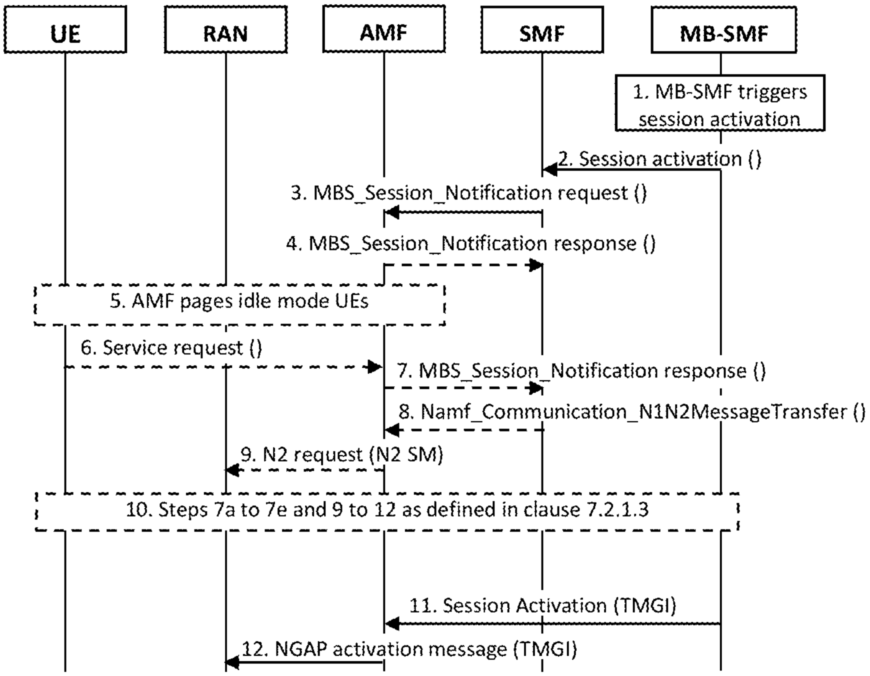
FIG. 3 shows a flowchart of MBS session activation procedure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable communication standards such as new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the communication protocols as defined by a standard organization such as 3GPP. For example, the communication protocols may comprise the first generation (1G), 2G, 3G, 4G, 4.5G, 5G communication protocols, and/or any other protocols either currently known or to be developed in the future.

The term "network device" or "network node" or "network function (NF)" refers to any suitable function which can be implemented in a network entity (physical or virtual) of a communication network. For example, the network function can be implemented either as a network element on a dedicated hardware, as a software instance running on a dedicated hardware, or as a virtualized function instantiated on an appropriate platform, e.g. on a cloud infrastructure. For example, the 5G system (5GS) may comprise a plurality of NFs such as AMF (Access and mobility Function), SMF (Session Management Function), AUSF (Authentication Service Function), UDM (Unified Data Management), PCF (Policy Control Function), AF (Application Function), NEF (Network Exposure Function), UPF (User plane Function) and NRF (Network Repository Function), RAN (radio access network), SCP (service communication proxy), NWDAF (network data analytics function), NSSF (Network Slice Selection Function), NSSAAF (Network Slice-Specific Authentication and Authorization Function), etc.

References in the specification to "one embodiment." "an embodiment." "an example embodiment." and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and B" or "at least one of A or B" should be understood to mean "only A, only B, or both A and B." The phrase "A and/or B" should be understood to mean "only A, only B, or both A and B".

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

Although the subject matter described herein may be implemented in any appropriate type of system using any suitable components, the embodiments disclosed herein are described in relation to a communication system complied with the exemplary system architecture illustrated in FIG. 1. For simplicity, the system architecture of FIG. 1 only depicts some exemplary elements. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices access to and/or use of the services provided by, or via, the communication system.

Figure 4:
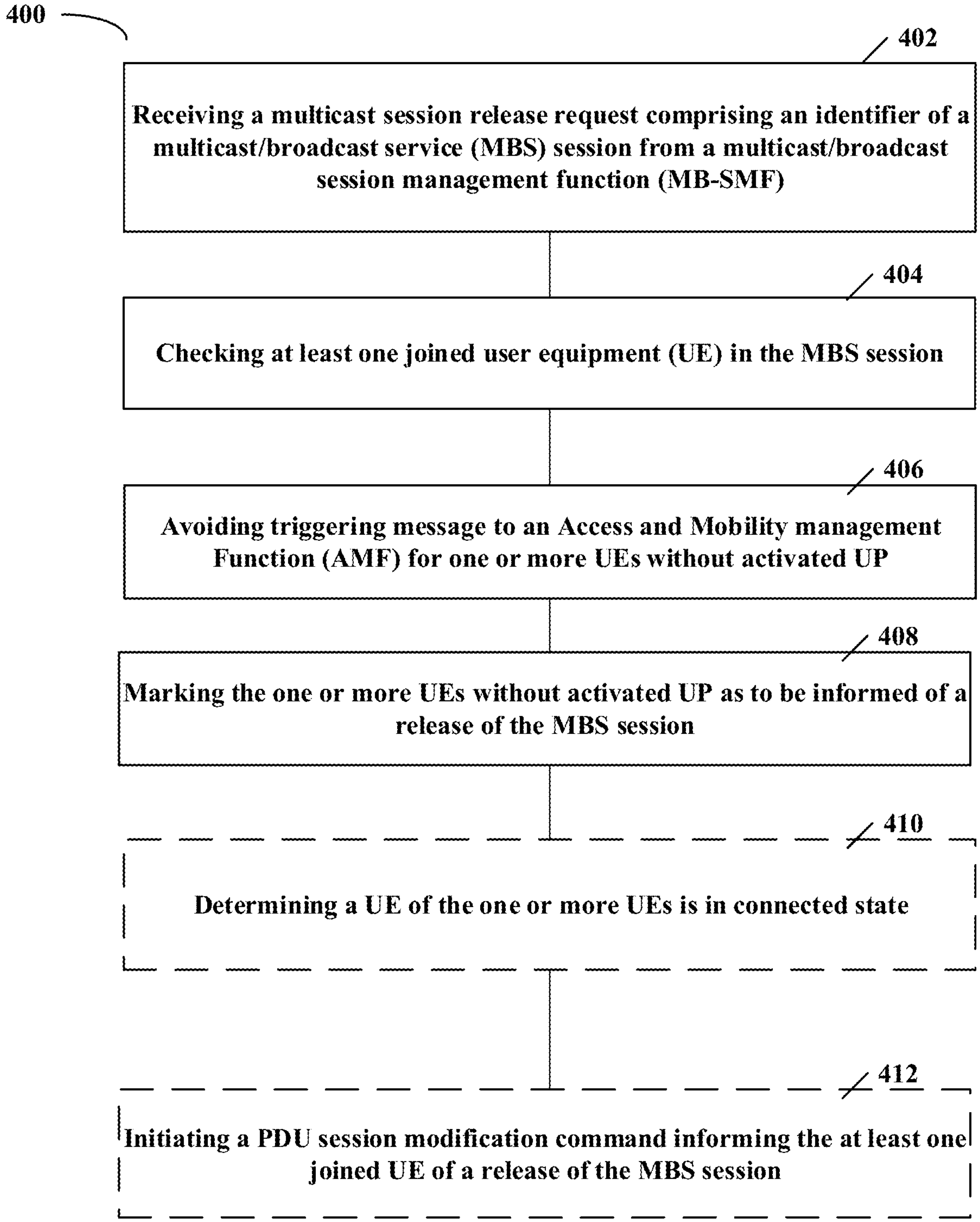
FIG. 4 shows a flowchart of a method according to an embodiment of the present disclosure.

FIG. 4 shows a flowchart of a method according to an embodiment of the present disclosure, which may be performed by an apparatus implemented in/as or communicatively coupled to a session management function (SMF). As such, the apparatus may provide means for accomplishing various parts of the method 400 as well as means for accomplishing other processes in conjunction with other components.

At block 402, the SMF may receive a multicast session release request comprising an identifier of a multicast/broadcast service (MBS) session from a multicast/broadcast session management function (MB-SMF). The MB-SMF may send the multicast session release request to the SMF due to various reasons. For example, when the AF determines to release the MBS Session, the AF may initiate MBS Session Release as specified in clause 7.1.1.3 of 3GPP TS 23.247 V1.0.0.

At block 404, the SMF may check at least one joined user equipment (UE) in the MBS session. For example, in a procedure of UE joining the multicast session, the SMF may know which UE has joined the MBS session. In a procedure of UE initiated multicast MBS session leave, the SMF may know which UE has leaved the MBS session. The SMF may know which UE(s) joined in the MBS session currently.

At block 406, the SMF may avoid triggering message to an Access and Mobility management Function, AMF, for one or more UEs without activated UP.

In an embodiment, the SMF may avoid triggering one or more UEs in idle state of the at least one joined UE to be paged.

As used herein, a UE in idle state means that the UE has no Non-Access-Stratum (NAS) signaling connection established with an access management node (such as AMF). In an embodiment, the idle state may comprise CM-IDLE state as described in 3GPP TS 23.501 V17.0.0, the disclosure of which is incorporated by reference herein in its entirety.

As used herein, a UE in connected state means that the UE has Non-Access-Stratum (NAS) signaling connection established with an access management node (such as AMF). In an embodiment, the connected state may comprise CM-CONNECTED state as described in 3GPP TS 23.501 V17.0.0.

In an embodiment, the SMF may determine whether a UE has an activated UP (user plane). If the UE has not activated UP, then the UE is in idle state. If the UE has activated UP, the UE is in connected state.

In an embodiment, the SMF may avoid triggering one or more UEs in idle state of the at least one joined UE to be paged. In another embodiment, the SMF may delay triggering one or more UEs in idle state of the at least one joined UE to be paged. For example, for UE(s) in idle state (e.g., without activated UP (user plane) or has no Non-Access-Stratum (NAS) signaling connection established with an access management node (such as AMF)), the SMF does not trigger a message to the AMF, e.g., the steps 3-7 in clause 7.2.5.2 of 3GPP TS 23.247 V1.0.0 are skipped. As another example, for UE(s) in idle state (e.g., without activated UP or has no Non-Access-Stratum (NAS) signaling connection established with an access management node (such as AMF)), the SMF delay triggering a message to the AMF, e.g., the execution of the steps 3-7 in clause 7.2.5.2 of 3GPP TS 23.247 V1.0.0 is delayed for example until the UE(s) in idle state (e.g., without activated UP or has no Non-Access-Stratum (NAS) signaling connection established with an access management node (such as AMF)) is required to be paged due to any other suitable reasons.

At block 408, optionally, the SMF may mark the one or more UEs without activated UP as to be informed of a release of the MBS session. In an embodiment, the SMF may mark the one or more UEs in idle state as to be informed of a release of the MBS session. Later when a UE is in connected state (e.g., the UP for the associated PDU Session of a UE is activated as specified in clause 4.2.3.2 and clause 4.2.3.3 of 3GPP TS 23.502 V17.0.0, the disclosure of which is incorporated by reference herein in its entirety, in step 4 of clause 4.2.3.2 of 3GPP TS 23.502 V17.0.0), the SMF initiates PDU Session Modification Command informing the UE of the MBS Session release if needed.

At block 410, optionally, the SMF may determine a UE of the one or more UEs is in connected state.

In an embodiment, when the SMF determines the user plane for the PDU session associated to the MBS session of the UE is activated, the SMF may determine the UE is in connected state.

In an embodiment, the SMF may determine the user plane for the PDU session associated to the MBS session of the UE is activated when the UE triggers a service request or a network entity triggers a service request with the UE.

In an embodiment, SMF may be able to determine that UE is in CONNECTED even without user plane activation.

For example, when a user plane for a protocol data unit (PDU) session associated to the MBS session of a UE is activated, the SMF may determine the UE is in connected state. In an embodiment, the SMF may determine the user plane for the PDU session associated to the MBS session of the UE is activated when the UE triggers a service request as specified in clause 4.2.3.2 of 3GPP TS 23.502 V17.0.0 or a network entity triggers a service request with the UE as specified in clause 4.2.3.3 of 3GPP TS 23.502 V17.0.0. For example, when the SMF receives Nsmf_PDUSession_UpdateSMContext Request comprises an input of PDU Session (s) to be re-activated from the AMF, the SMF may determine a user plane for a protocol data unit (PDU) session associated to the MBS session of a UE is activated.

At block 412, optionally, the SMF may initiate a PDU session modification command informing the at least one joined UE of a release of the MBS session. For example, the SMF may initiate a PDU session modification command informing one or more UEs in connected state (e.g., with activated user plane or has no Non-Access-Stratum (NAS) signaling connection established with an access management node (such as AMF)) of the at least one joined UE of a release of the MBS session. The SMF may initiate a PDU session modification command informing one or more UEs (whose user planes are not activated but there is signaling communication between the one or more UEs and SMF) of the at least one joined UE of a release of the MBS session. Block 412 may be performed immediately after block 404. For example, for the joined UEs with UP activated, the SMF invokes Namf_Communicate_NIN2MessageTransfer as described in 3GPP TS 23.247 V1.0.0 to the AMF. The N1 SM container indicates MBS session release. In N2 SM information, the SMF informs the NG-RAN to remove the UE from the MBS session. In addition, block 412 may be performed after block 410. For example, the SMF may initiate PDU session modification command informing the one or more UEs in idle state of the MBS Session release when the one or more UEs in idle state are in connected state again (e.g., at next UP activation of the associated PDU session of the one or more UEs).

In an embodiment, clause 7.2.2.3 of 3GPP TS 23.247 V1.0.0 may be amended as following.

7.2.2.3 MBS Session Release

When the AF determines to release the MBS Session, the AF initiates MBS Session Release as specified in clause 7.1.1.3 of 3GPP TS 23.247 V1.0.0.

When the SMF receives the multicast session release request from the MB-SMF, the SMF initiates procedures to remove joined UEs from the MBS session.

NOTE: For the active MBS session, the MB-SMF can triggers Multicast Session Deactivation towards the NG-RAN via the AMF to release radio resources of the MBS session as specified in step 3 to step 7 in clause 7.2.5.3 of 3GPP TS 23.247 V1.0.0, prior to or in parallel with sending multicast session release request to the SMF.]

Editor's note: Whether the MB-SMF triggers radio resource release procedure is necessary is FFS, i.e. the radio resource release can also be done as part of the UE multicast session release procedure and not need be as an additional procedure.

Figure 5:
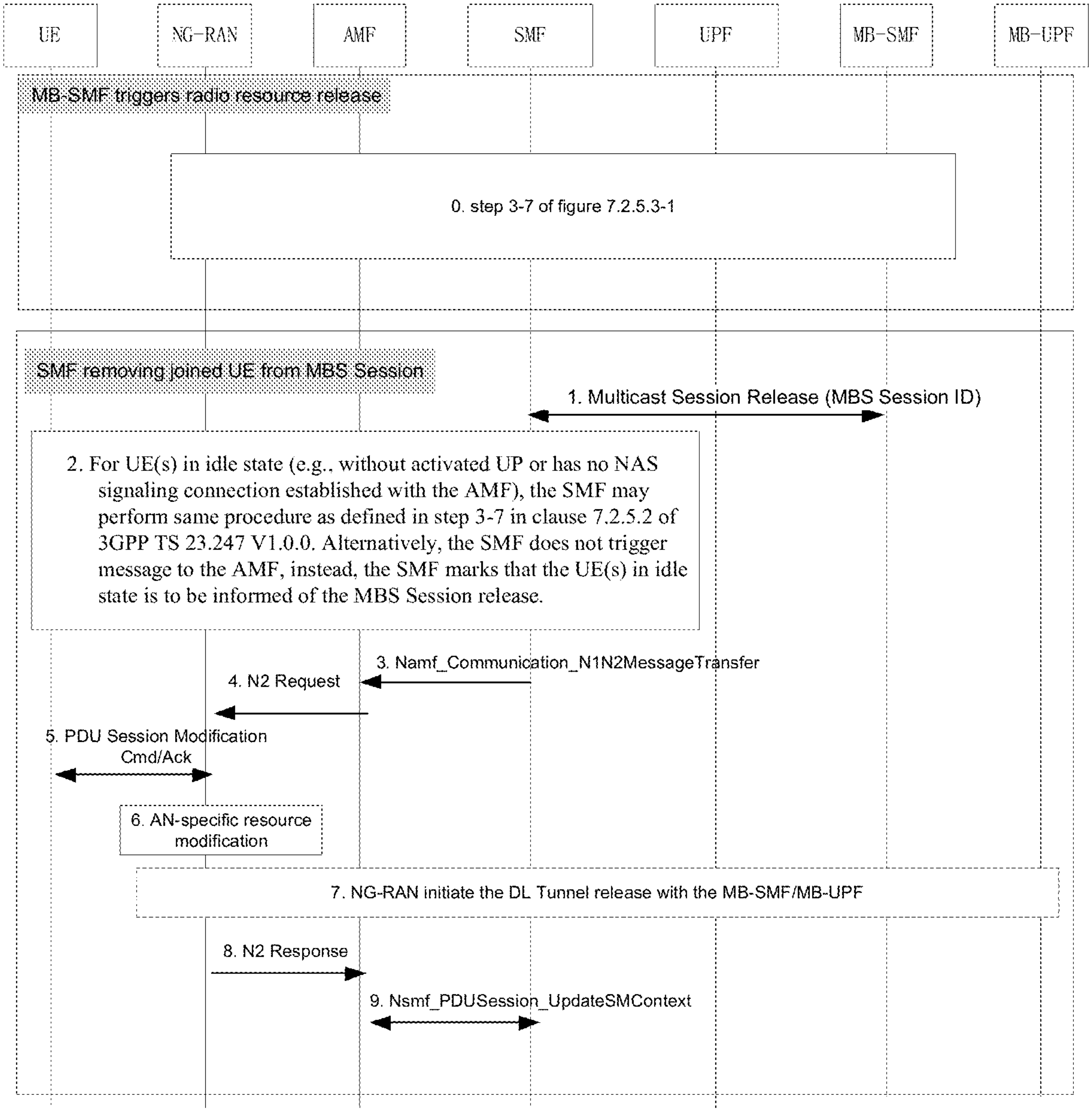
FIG. 5 shows a flowchart of SMF removing joined UEs from MBS session according to an embodiment of the present disclosure.

FIG. 5 shows a flowchart of SMF removing joined UEs from MBS session according to an embodiment of the present disclosure.

Step 0. The MB-SMF triggers the NG-RANs via the AMFs to release radio resources for the MBS session. Same procedure as defined in step 3-7 in clause 7.2.5.3 of 3GPP TS 23.247 V1.0.0 is used.

Step 1. The SMF receives Multicast Session Release request from the MB-SMF with MBS Session ID. The SMF checks joined UEs. The SMF sends Multicast Session Release response to the MB-SMF.

Step 2. For UE(s) in idle state (e.g., without activated UP or has no NAS signaling connection established with the AMF), the SMF may perform same procedure as defined in step 3-7 in clause 7.2.5.2 of 3GPP TS 23.247 V1.0.0.

Alternatively, for UE(s) in idle state (e.g., without activated UP or has no NAS signaling connection established with the AMF), the SMF does not trigger message to the AMF, instead, the SMF marks that the UE(s) in idle state is to be informed of the MBS Session release.

NOTE: The SMF initiates PDU Session Modification informing the UE of the MBS Session release when the UE(s) in idle state is in connected state again (e.g., at next UP activation of the associated PDU Session of the UE(s) or has NAS signaling connection established with the AMF).

Step 3. For the joined UEs with UP activated, the SMF invokes Namf_Communicate_NIN2MessageTransfer to the AMF. The N1 SM container indicates MBS session release. In N2 SM information, the SMF informs the NG-RAN to remove the UE from the MBS session.

Step 4. The AMF sends N2 Request to the NG-RAN.

Step 5. The NG-RAN transports the N1 SM container (PDU Session Modification Command) to the UE.

Step 6. The NG-RAN performs radio resource modification. If no joined UEs in the MBS session, the NG-RAN release the radio resources.

Step 7. If no joined UEs in the MBS session, for unicast transport of N3mb, the NG-RAN initiates the DL tunnel release towards MB-UPF via AMF and MB-SMF. For multicast transportation of N3mb, the NG-RAN perform IGMP/MLD Leave for the MBS session.

Step 8. The NG-RAN sends N2 Response to the AMF. If no joined UEs in the MBS session, the MBS Session context is removed from the NG-RAN.

Step 9. The AMF transfers the N2 message received in step 8 to the SMF via the Nsmf_PDUSession_UpdateSMContext service operation. The SMF removes the UE from the MBS Session Later when a UE is in connected state again (e.g., the UP for the associated PDU Session is activated as specified in clause 4.2.3.2 and clause 4.2.3.3 of 3GPP TS 23.502 V17.0.0, in step 4 of clause 4.2.3.2 of 3GPP TS 23.502 V17.0.0 or has NAS signaling connection established with the AMF), the SMF initiates PDU Session Modification command informing the UE of the MBS Session release if needed.

The update to clause 7.2.2.3 of TS 23.247 V1.0.0 may be as following. At step 2, an alternative is provided that the SMF marks that the UE(s) in idle state (e.g., without activated UP or has no NAS signaling connection established with the AMF) is to be informed of MBS Session release. When the UE(s) is in connected state again (e.g., UP of the associated PDU Session of the UE(s) is activated or has NAS signaling connection established with the AMF), the SMF sends a PDU Session Modification Command informing the UE(s) of the MBS Session release.

Many advantages may be achieved by applying the proposed solution according to embodiments of the present disclosure. For example, some embodiments of the present disclosure can avoid paging to UE(s) that joined an MBS Session just for the purpose of informing the UE(s) of the MBS Session release, therefore signaling for paging and paging response can be saved. The embodiments herein are not limited to the features and advantages mentioned above. A person skilled in the art will recognize additional features and advantages upon reading the following detailed description.

Figure 6:
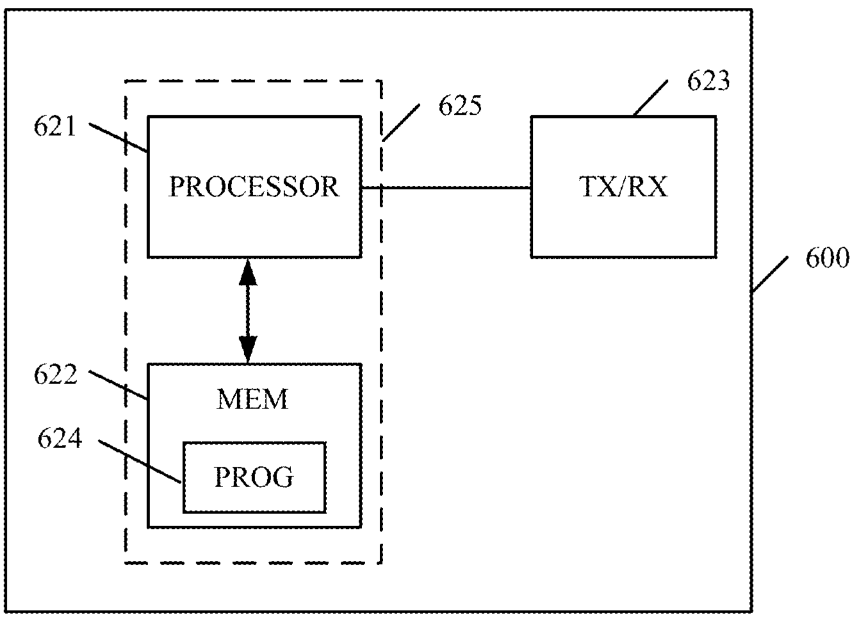
FIG. 6 is a block diagram showing an apparatus suitable for use in practicing some embodiments of the disclosure.

FIG. 6 is a block diagram showing an apparatus suitable for practicing some embodiments of the disclosure. For example, the SMF described above may be implemented as or through the apparatus 600.

The apparatus 600 comprises at least one processor 621, such as a digital processor (DP), and at least one memory (MEM) 622 coupled to the processor 621. The apparatus 600 may further comprise a transmitter TX and receiver RX 623 coupled to the processor 621. The MEM 622 stores a program (PROG) 624. The PROG 624 may include instructions that, when executed on the associated processor 621, enable the apparatus 600 to operate in accordance with the embodiments of the present disclosure. A combination of the at least one processor 621 and the at least one MEM 622 may form processing means 625 adapted to implement various embodiments of the present disclosure.

Various embodiments of the present disclosure may be implemented by computer program executable by one or more of the processor 621, software, firmware, hardware or in a combination thereof.

The MEM 622 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 621 may be of any type suitable to the local technical environment, and may include one or more of general purpose computers, special purpose computers, microprocessors, digital signal processors (DSPs) and processors based on multicore processor architecture, as non-limiting examples.

In an embodiment where the apparatus is implemented as or at the SMF, the memory 622 contains instructions executable by the processor 621, whereby the SMF operates according to any of the methods related to the SMF as described above.

Figure 7:
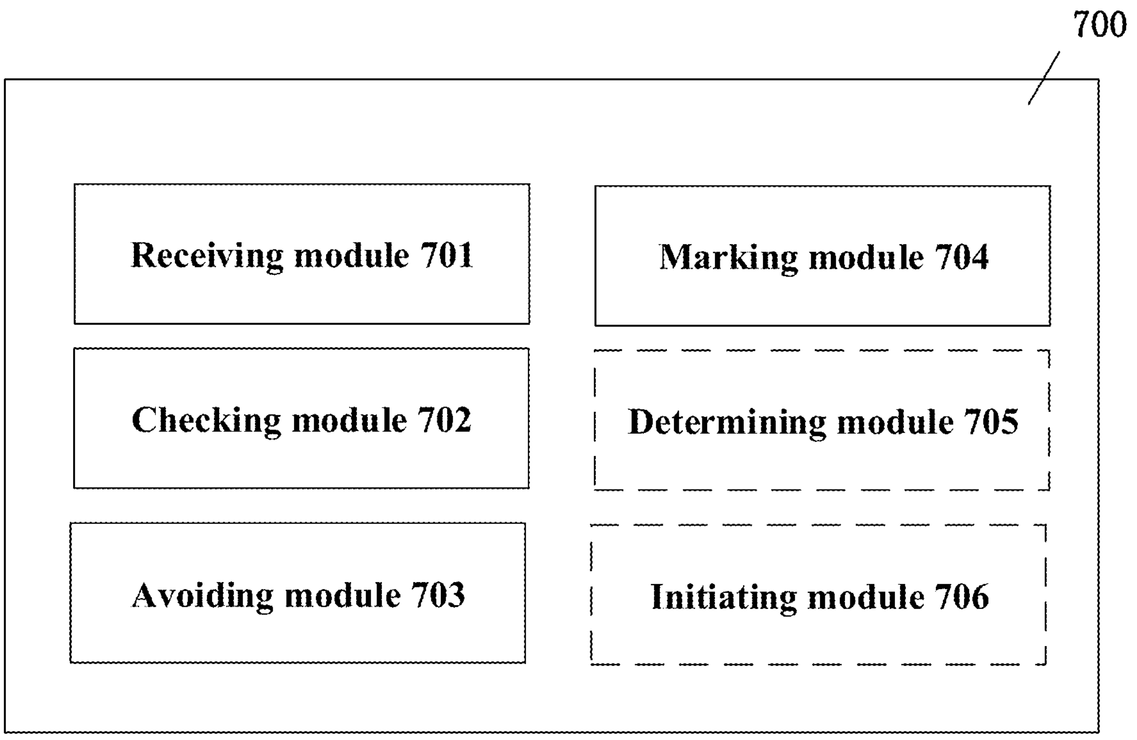
FIG. 7 is a block diagram showing a SMF according to an embodiment of the disclosure.

FIG. 7 is a block diagram showing a SMF according to an embodiment of the disclosure. As shown, the SMF 700 comprises a receiving module 701 configured to receive a multicast session release request comprising an identifier of a multicast/broadcast service (MBS) session from a multicast/broadcast session management function (MB-SMF). The SMF 700 further comprises a checking module 702 configured to check at least one joined user equipment (UE) in the MBS session. The SMF 700 further comprises an avoiding module 703 configured to avoid triggering message to an Access and Mobility management Function (AMF) for one or more UEs without activated UP. The SMF 700 further comprises a marking module 704 configured to mark the one or more UEs without activated UP as to be informed of a release of the MBS session.

In an embodiment, the SMF 700 further comprises a determining module 705 configured to determine a UE of the one or more UEs is in connected state.

In an embodiment, the determining module 705 may determine the user plane for the PDU session associated to the MBS session of the UE is activated.

In an embodiment, the determining module 705 may determine a user plane for a protocol data unit (PDU) session associated to the MBS session of a UE is activated when the UE triggers a service request or a network entity triggers a service request with the UE.

In an embodiment, the SMF 700 further comprises an initiating module 706 configured to initiate a PDU session modification command informing one or more UEs with activated user plane of the at least one joined UE of a release of the MBS session.

The term unit or module may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With function units, the SMF may not need a fixed processor or memory, any computing resource and storage resource may be arranged from the SMF in the communication system. The introduction of virtualization technology and network computing technology may improve the usage efficiency of the network resources and the flexibility of the network.

According to an aspect of the disclosure it is provided a computer program product being tangibly stored on a computer readable storage medium and including instructions which, when executed on at least one processor, cause the at least one processor to carry out any of the methods as described above.

According to an aspect of the disclosure it is provided a computer-readable storage medium storing instructions which when executed by at least one processor, cause the at least one processor to carry out any of the methods as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

The invention claimed is:

1. A method performed by a session management function (SMF), comprising:

receiving a multicast session release request comprising an identifier of a multicast/broadcast service (MBS) session from a multicast/broadcast session management function (MB-SMF);

checking at least one joined user equipment (UE) in the MBS session;

avoiding triggering message to an Access and Mobility management Function, AMF, for one or more UEs without activated user plane (UP);

marking the one or more UEs without activated UP as to be informed of a release of the MBS session; and initiating a Protocol Data Unit (PDU) Session Modification Command informing the one or more UEs of the release of the MBS session, wherein sending the PDU Session Modification Command is delayed until a next UP activation for an associated PDU Session.

2. The method according to claim 1, further comprising:

determining a UE of the one or more UEs is in connected state.

3. The method according to claim 2, wherein determining the UE of the one or more UEs is in connected state comprises determining the UP for a PDU session associated to the MBS session of the UE is activated.

4. The method according to claim 3, wherein determining the user plane for the PDU session associated to the MBS session of the UE is activated comprises determining the user plane for the PDU session associated to the MBS session of the UE is activated when the UE triggers a service request or a network entity triggers a service request with the UE.

5. A session management function (SMF), comprising:

a processor; and a memory coupled to the processor, said memory containing instructions executable by said processor, whereby said SMF is operative to:

receive a multicast session release request comprising an identifier of a multicast/broadcast service (MBS) session from a multicast/broadcast session management function (MB-SMF);

check at least one joined user equipment (UE) in the MBS session;

avoid triggering message to an Access and Mobility management Function (AMF) for one or more UEs without activated user plane (UP);

mark the one or more UEs without activated UP as to be informed of a release of the MBS session; and initiate a Protocol Data Unit (PDU) Session Modification Command informing the one or more UEs of the release of the MBS session, wherein sending the PDU Session Modification Command is delayed until a next UP activation for an associated PDU Session.

6. The SMF according to claim 5, wherein the SMF is further operative to determine a UE of the one or more UEs is in connected state.

7. The SMF according to claim 6, wherein the SMF operative to determine the UE of the one or more UEs is in connected state comprises the SMF operative to determine the UP for a PDU session associated to the MBS session of the UE is activated.

8. The SMF according to claim 7, wherein the SMF operative to determine the user plane for the PDU session associated to the MBS session of the UE is activated comprises the SMF operative to determine the user plane for the PDU session associated to the MBS session of the UE is activated when the UE triggers a service request or a network entity triggers a service request with the UE.

9. A non-transitory computer-readable storage medium storing instructions which when executed by at least one processor, cause the at least one processor to perform the method according to claim 1.

10. A non-transitory computer program product comprising instructions which when executed by at least one processor, cause the at least one processor to perform the method according to claim 1.

* * * * *